US007424458B2

(12) United States Patent
Pintsov et al.

(10) Patent No.: US 7,424,458 B2

(45) Date of Patent: Sep. 9, 2008

(54) METHOD AND SYSTEM FOR GENERATING CHARACTERIZING INFORMATION DESCRIPTIVE OF PRINTED MATERIAL SUCH AS ADDRESS BLOCKS AND GENERATING POSTAL INDICIA OR THE LIKE INCORPORATING SUCH CHARACTERIZING INFORMATION

(75) Inventors: Leon A. Pintsov, West Hartford, CT (US); Matthew J. Campagna, Ridgefield, CT (US); Danny Lelli, Kanata (CA)

(73) Assignee: Pitney Bowes Inc., Stamford, CT (US)

( * ) Notice: Subject to any disclaimer, the term of this patent is extended or adjusted under 35 U.S.C. 154(b) by 706 days.

(21) Appl. No.: 10/719,051

(22) Filed: Nov. 21, 2003

(65) Prior Publication Data

US 2005/0114268 A1 May 26, 2005

(51) Int. Cl.
*G06F 17/60* (2006.01)

(52) U.S. Cl. .............................. 705/60; 705/50; 705/51

(58) Field of Classification Search ................... 705/60, 705/50, 51

See application file for complete search history.

(56) References Cited

U.S. PATENT DOCUMENTS

| | | | |
|---|---|---|---|
| 3,978,457 | A | 8/1976 | Check et al. |
| 4,168,533 | A | 9/1979 | Schwartz |
| 4,222,518 | A | 9/1980 | Simjian et al. |
| 4,226,360 | A | 10/1980 | Simjian et al. |
| 4,301,507 | A | 11/1981 | Soderberg et al. |
| 4,493,252 | A | 1/1985 | Clark |
| 4,579,054 | A | 4/1986 | Buan et al. |
| 4,629,871 | A | 12/1986 | Scribner et al. |
| 4,725,718 | A | 2/1988 | Sansone et al. |
| 4,757,532 | A | 7/1988 | Gilham |
| 4,757,537 | A | 7/1988 | Edelmann et al. |
| 4,775,246 | A | 10/1988 | Edelmann et al. |
| 4,831,555 | A | 5/1989 | Sansone |
| 4,873,645 | A | 10/1989 | Hunter et al. |
| 4,900,903 | A | 2/1990 | Wright et al. |

(Continued)

FOREIGN PATENT DOCUMENTS

| | | | |
|---|---|---|---|
| EP | 1022692 | A2 | 7/2000 |
| EP | 1033686 | A2 | 9/2000 |
| JP | 411328463 | A * | 11/1999 |

*Primary Examiner*—Pierre Eddy Elisca
(74) *Attorney, Agent, or Firm*—Ronald Reichman; Angelo N. Chaclas

(57) ABSTRACT

A method and system for generating and printing an indicium, such as a postal indicium, on an object such as a mail piece. A digital image of other printed material, such as an address block, on the object is obtained, and the image is processed to abstract characterizing information descriptive aspects of the other printed material. The aspects can be measurements of word lengths, counts of outliers in images of characters, or descriptions of the shape of the other printed material. The characterizing information is combined with other information, such as postal information, and the combined information is then cryptographically authenticated with a digital signature or the like. An indicium representative of the authenticated information is then printed on the object. The object's relationship to the indicium can be verified by regenerating the characterizing information from the other printed material and comparing the regenerated characterizing information with characterizing information recovered from the indicium. Thus, copies of the indicium cannot easily be used, without detection, on other objects which do not include the other printed material.

32 Claims, 6 Drawing Sheets

U.S. PATENT DOCUMENTS

| | | | | |
|---|---|---|---|---|
| 4,907,271 | A | 3/1990 | Gilham | |
| 5,448,641 | A | 9/1995 | Pintsov et al. | |
| 5,454,038 | A | 9/1995 | Cordery et al. | |
| 5,625,694 | A | 4/1997 | Lee et al. | |
| 6,108,643 | A | 8/2000 | Sansone | 705/62 |
| 6,157,919 | A | 12/2000 | Cordery et al. | 705/60 |
| 2003/0101143 | A1 * | 5/2003 | Montgomery et al. | 705/62 |
| 2004/0059676 | A1 * | 3/2004 | Rozendaal et al. | 705/50 |

* cited by examiner

METHOD AND SYSTEM FOR GENERATING CHARACTERIZING INFORMATION DESCRIPTIVE OF PRINTED MATERIAL SUCH AS ADDRESS BLOCKS AND GENERATING POSTAL INDICIA OR THE LIKE INCORPORATING SUCH CHARACTERIZING INFORMATION

RELATED APPLICATIONS

The present application relates to similar subject matter as, and shares elements of disclosure with, commonly assigned application "Method and System for Generating Postal Indicia Or The Like" Ser. No. 10/719,050, filed on even date herewith.

BACKGROUND OF THE INVENTION

The subject invention relates to the problem of providing a robust, compact characterization of a block of printed text which will distinguish the block of text from other such blocks. More particularly, it relates to the problem of providing an image-based characterization of a printed address block which can be incorporated into a digital postal indicium.

Postage metering systems account for postage and other values such as parcel delivery service charges and tax stamps, and print indicia representative of such values as proof of payment. To protect against counterfeiting of indicia modern digital postage metering systems use encryption technology. The postage value and other information relating to an indicium are preferably digitally signed, or otherwise cryptographically authenticated, and the information and signature are incorporated into the digital postal indicium.

Digital postal indicia using encryption technologies are extremely secure. In general, without knowledge of the proper encryption keys, it is essentially impossible to produce a counterfeit digital indicium. However, digital indicia are subject, as are all postal indicia, to "rubber-stamp" duplication or reply attack where a valid indicium is scanned and reproduced on multiple mail pieces. To prevent such "rubber-stamp" duplication it is known to incorporate information from the address block of the mail piece into the postal indicium. Because space on an envelope is limited, typically only a small portion of the information in the address block will be incorporated into the indicium.

In FIG. 1, typical prior art mailing system 10 includes address printer controller 12, address printer 14, postage meter 16, and indicia printer 20. Address printer controller 12 receives address information from a data processing system (not shown), generates a bitmap, and controls address printer 12 to print address block A, representative of the address, on envelope F. Meter 16 receives postage information, and other information, from the data processing system. Meter 16 also receives characterizing information descriptive of block A from address printer controller 12. The information received can be either text-based or image-based. Text-based information is descriptive of the words or characters making up to the address, (e.g., ASCII code) while image-based information is descriptive of the actual printed image bits of pixels in the address block. Meter 16 combines the characterizing information with the postage value and other information, typically digitally signs the combination, generates a bitmap representative of an indicium including the digitally signature and controls indicia printer 20 to print indicium I on envelope E. When the mail piece is received by a postal service, the address block can be scanned again, and the information regenerated from the scanned address block compared to information recovered from indicium I; thus tying indicium I to the particular mail piece. (Note that since the indicium is cryptographically linked to the address on the mail piece, printer 20 need not be a secure printer; but can be a general purpose printer which can be controlled by other devices for other uses.) Commonly assigned, provisional application System And Method For Mail Destination Address Information Encoding Protection And Recovery In Postal Payment", Ser. No. 60/386,868 discloses a system similar to that of the FIG. 1 using text-based characterizations of the address block.

While useful for its intended purpose, system of FIG. 1 and similarly systems still have problems. It has proven difficult to reliably recover textual information from address blocks during the validation process using available optical character recognition (OCR) techniques. Attempts to increase the robustness of text-based systems by incorporation of additional information and/or the use of error correcting codes has resulted in undesirable increases in indicia size and computational complexity. Thus, it is an object of the present invention to provide a method and system for providing descriptive information which will substantially uniquely identify a block of text in a robust and compact manner. (By "robust and compact" herein is meant information which is small enough in quantity to be incorporated into postal indicia yet will identify a text block, and distinguish among text blocks, with sufficient reliability to deter "rubber stamp" despite errors introduced by the printing and/or scanning processes.)

BRIEF SUMMARY OF THE INVENTION

The above objective is achieved and the disadvantages of the prior art are overcome in accordance with the subject invention by a method and system for generating and printing an indicium on an object. Other information is printed on the object and the system is controlled in accordance with the method to obtain a digital image of the other printed material and generate characterizing information descriptive of aspects of the image, the aspects being selected from the group consisting of, lengths of elements of the image, numbers of outliers in the image, and shapes of the image or of elements of the image, the characterizing information being selected to fit within the indicium; cryptographically authenticate the characterizing information and other information; generate the indicium to be representative of the cryptographically authenticated information; and print the indicium on the object. Thus, the object's relationship to the indicium can be verified by regenerating the characterizing information from the other printed material and comparing the regenerated characterizing information with characterizing information recovered from the indicium, and copies of said indicium cannot easily be used without detection on other objects which do not include said other printed material.

In accordance with one aspect of the subject invention, the indicium is a postal indicium and the object is a mail piece.

In accordance with another aspect of the subject invention, the other printed block is an address block and the characterizing information includes measurements of word lengths of words comprised in the address block.

In accordance with another aspect of the subject invention the other printed material is an address block and the characterizing information includes a count of outliers in the address block.

In accordance with another aspect of the subject invention the other printed material is an address block and the characterizing information includes information which is descriptive of the shape of the address block, or of lines, or of words comprised in the address block.

Other objects and advantages of the present invention will be apparent to those skilled in the art from consideration of the detailed description set forth below and the attached drawings.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF PREFERRED EMBODIMENTS

Figure 1:
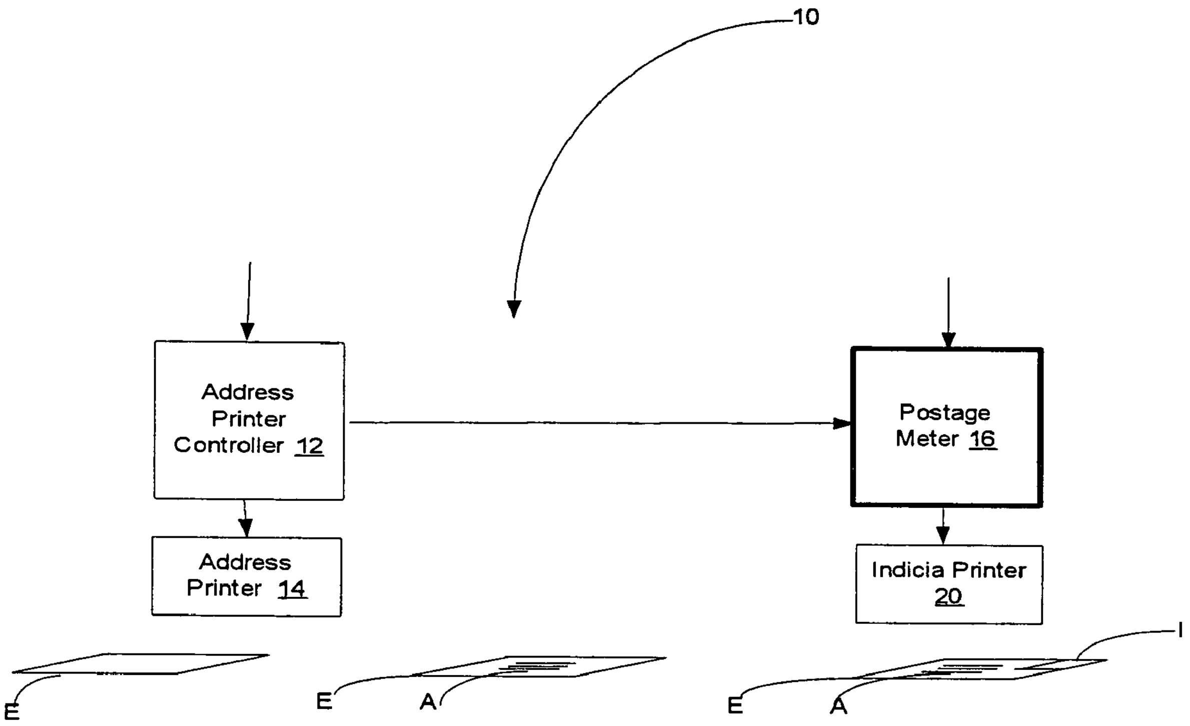
Fig. 1 Prior Art
FIG. 1 shows a schematic block diagram of a prior art mailing system.
Figure 2:
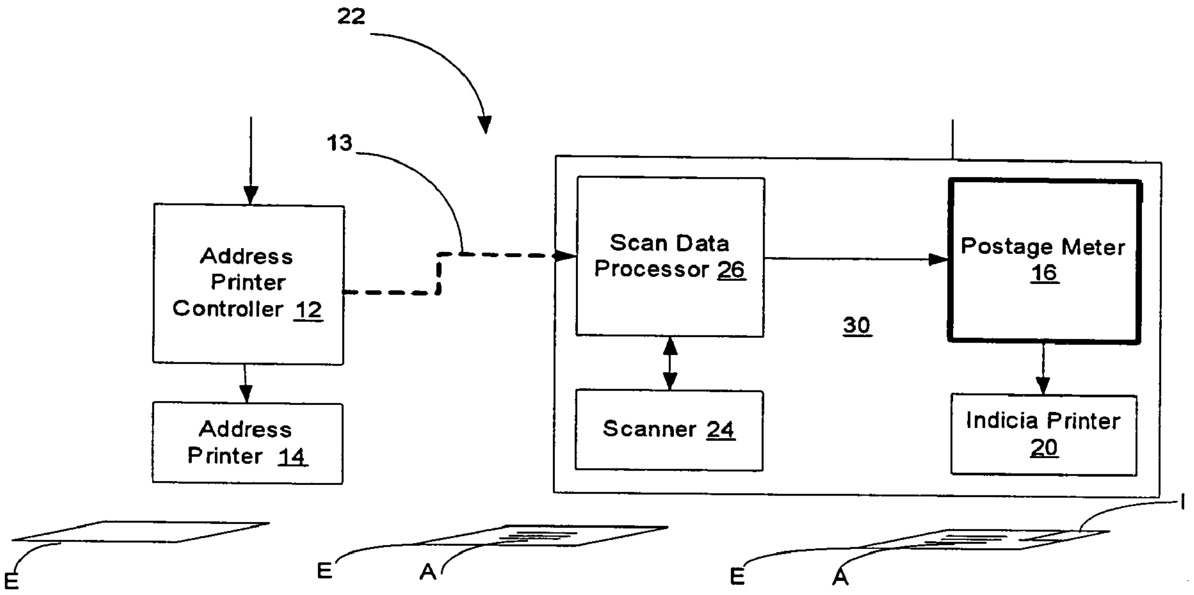
FIG. 2 shows a schematic block diagram of a mailing system in accordance with the subject invention.

In FIG. 2, mailing system 22 includes address printer controller 12, address printer 14, Postage meter 16, and indicia printer 20, which are substantially similar to the corresponding prior art elements shown in FIG. 1. System 22 differs in that scanner 24 scans address block A and scanned data processor 26 generates the characterizing information provided to meter 16 from the scanned image. (In another embodiment of the subject invention, printer controller 12 communicates the bit map used to drive printer 14 to processor 26 (as shown by dotted line connection 13 in FIG. 2). Processor 26 then generates the characterizing information from the bit map in the same manner as from the scanned image. In this embodiment, scanner 24 is used for pre-printed addresses, where a bit map is not available; or can be eliminated. Together meter 16, printer 20, scanner 24 (if present), and processor 26 form secure postal indicia printing system 30. Preferably, scanner 24 scans address A to generate a bit map which is processed by processor 26 to generate the characterizing confirmation, as will be described below; however, any convenient combination of scanning and processing techniques which provides a digital image and from which suitable characterizing information can be generated can be used. Use of a separate processor 26 is preferred since it allows the subject invention to be used with an existing postage meter; however, it will be apparent to those skilled in art that postage meter 16, or controller 12, can be programmed to implement the functions of processor 26. Similarly, a single processor can be programmed to manage both control of scanner 24 and processing of the scanned image.) It is believed that more robust results are obtained when the regenerated characterizing information, generated from a scanned image of address block A is compared to characterizing information recovered from indicium I where the recovered information was also generated from a scanned image, rather than from a pristine bit map; and thus includes the inaccuracies and errors introduced into the image by the printing and scanning processes.

A group of three methods for generation of image-based characterizing information, which are believed to provide improved compactness and robustness in accordance with the above object of the invention, have been found. Each of these methods is believed to provide a sufficiently high likelihood of detection to deter "rubber stamp" counterfeiting, particularly by large scale mailers, while having a sufficiently low rate of false positives that it will not unduly delay mail processing. It is believed that each of these methods, in general, will provide characterizing information which can be specified by a bit stream of approximately 6 to 12 bytes.

Figure 3:
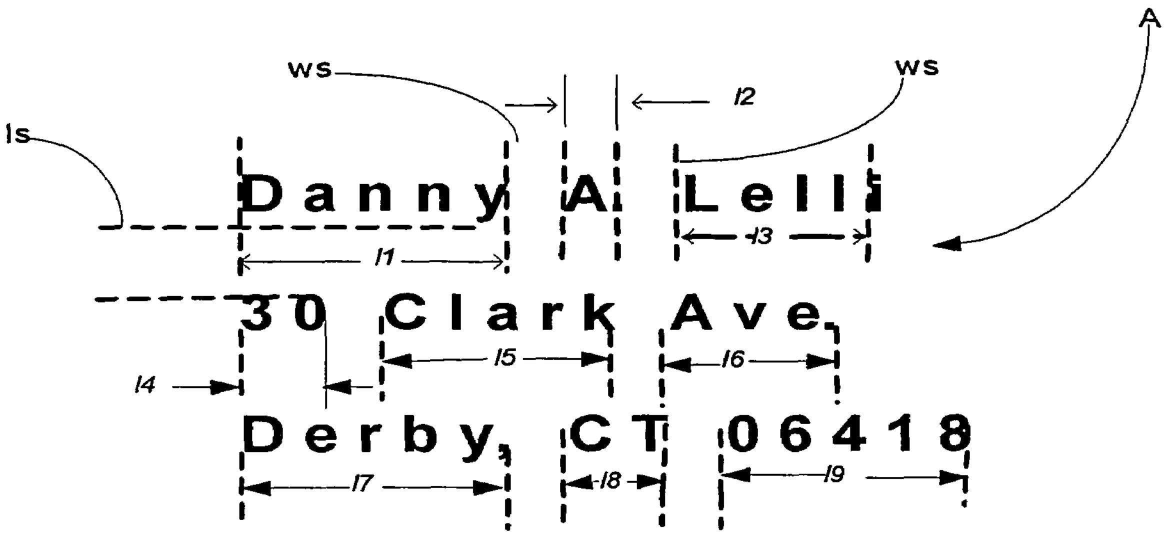
FIG. 3 illustrates a method for abstracting characterizing information descriptive of an address block from an image of the address block in accordance with one embodiment of the subject invention.

An embodiment of the subject invention where the characterizing information comprises measurements of the lengths of the individual words which make up address A, is shown in FIG. 3. Address block A is parsed to identify individual words by first identifying line spaces ls by determining the occurrence of large amounts of horizontal white space between blocks of printed text, and then identifying word spaces ws by determining the occurrence of large amounts of vertical white space between blocks of printed text (as shown with respect the first line of address A). Word lengths /1 through /9 are then determined for address A. Preferably, word lengths are taken (measured in pixels) from the edges of word spaces ws (or the address edges) as shown, but can be taken in any convenient manner, such as along the midline of the words.

As noted, the amount of space available in the indicium is limited. Assuming that eight bytes, 64 bits, can be allocated to incorporate the characterizing information, and allowing up to four bits for codes, 60 bits are available to include the characterizing information. (The actual number of bits which can be allocated to express the characterizing information is determined by the size and shape of the postal indicium and the resolution with which the indicium can be printed and scanned.) Table 1 shows the relationship between the number of bits used to encode each word, the number of words which can be encoded, and the granularity (i.e., the number of lengths which can be distinguished) with which the word lengths can be measured.

TABLE 1

| | | | | | | | |
|---|---|---|---|---|---|---|---|
| Bits/Word | 2 | 3 | 4 | 5 | 6 | 7 | 8 |
| Number of Encodable Words | 30 | 20 | 15 | 12 | 10 | 8 | 7 |
| Granularity | 4 | 8 | 16 | 32 | 64 | 128 | 256 |

It is believed that using four or fewer bits per word would not be useful in postal applications. Thus, in a preferred embodiment, the number of bits used can be selected to encode all words in the address and two control bits will be sufficient to indicate selection of five to eight bits per word to encode the length of the word. In other embodiments a fixed number of words in the address, for example the first eight, can be scanned at a fixed number of bits per word; eight in this case, since control bits would not be needed to specify the number of bits per word.

EXAMPLE

Figure 4:
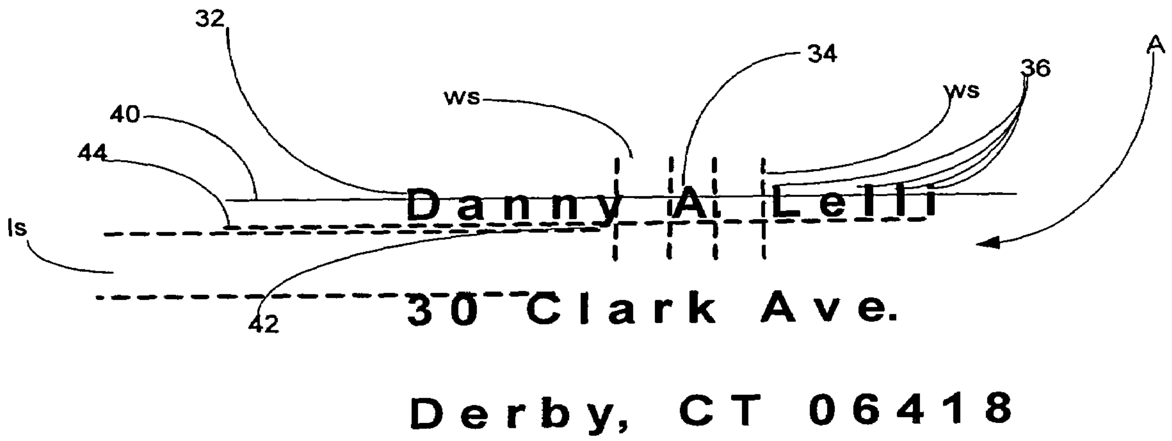
FIG. 4 illustrates a method for abstracting characterizing information descriptive of an address block from an image of the address block in accordance with another embodiment of the subject invention.
Figure 5:
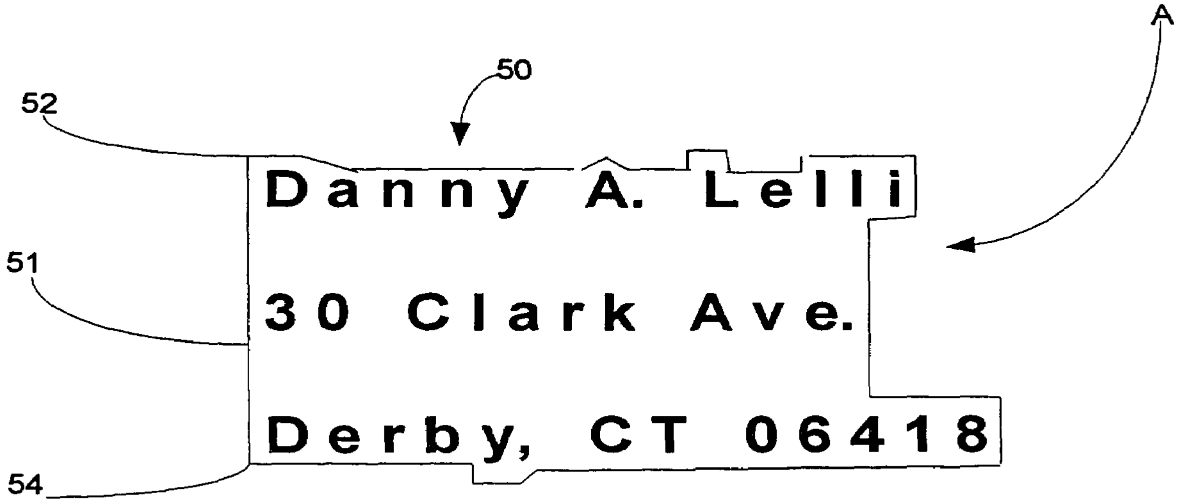
FIG. 5 illustrates a method for abstracting characterizing information descriptive of an address block from an image of the address block in accordance with another embodiment of the subject invention.

An address such as shown in FIGS. 3-5 may, depending on the print font selected, etc., produce the following results using six bits per word:

| | Word# | | | | | | | | |
|---|---|---|---|---|---|---|---|---|---|
| | 1 | 2 | 3 | 4 | 5 | 6 | 7 | 8 | 9 |
| Length(pixels) | 173 | 45 | 150 | 60 | 154 | 103 | 168 | 68 | 189 |

Preferably the absolute lengths are then normalized to the range 1-63, i.e. $2^0-(2^6-1)$, so that the smallest value (45) is mapped to 1 and the largest (189) is mapped to 63 by the relationship: Normalized length=(63−1)/(189−45)*(length in pixels)−18.375≈0.43*(length in pixels)−18.375, yielding:

| | Word# | | | | | | | | |
|---|---|---|---|---|---|---|---|---|---|
| | 1 | 2 | 3 | 4 | 5 | 6 | 7 | 8 | 9 |
| Length(normalized) | 56 | 1 | 46 | 7 | 48 | 26 | 54 | 11 | 63 |

The normalized lengths are then encoded into a bit stream, where code 01 indicates six bits per word:

```
01-111001-000001-101110-000111-110000-011010-1101010-001011-111111-000000
|  |      |      |      |      |      |      |       |      |      |
Code Word1   Word2   Word3  ... ... ...                    Null word
```

This bit stream is then incorporated into the indicium to provide a robust and compact characterization of address block A; and, when the indicium is then digitally signed in a conventional manner, will cryptographically link the indicium to the address and associated mail piece. (Note that only bits are included in the actual bit streams of this and other embodiments, and other typographic markings are included only for clarity.)

Another embodiment of the subject invention, where the characterizing information comprises measurements of the number of "outliers" in each word (or each line) which make up address A, is shown in FIG. 4. (By "outliers" herein is meant ascenders or descenders and portions capitals of which project beyond thresholds, which are preferably determined by the upper and lower bounds of lower case letters without ascenders or descenders, such as "a", "c", "e", etc.) Address A is parsed to identify individual words, if necessary, by first identifying line spaces ls by determining the occurrence of large amounts of horizontal white space between blocks of printed text, and then identifying word spaces ws by determining the occurrence of large amounts of vertical white space between blocks of printed text (as shown with respect the first line of address A). Otherwise only the lines need be identified.

Again assuming six bits are allocated per word, the number of upwards (+) and downwards (−) outliers per word can be encoded as "xxx/yyy" where x and y are binary digits and xxx is the number of (+) outliers and yyy is the number of (−) outliers.

Whether outliers are recorded per word or per line can be a predetermined design feature, or pre-set for particular applications or can be program controlled. For example, normally an address block would be characterized by the number of outliers per word but long addresses could be characterized per line.

EXAMPLE

Again taking eight bytes as the space allocated for the address block characterizing information, as shown in FIG. 4 with respect to the first address line, (+) outliers 32, in word 1; 34, in word 2; and 36, in word 3 are identified as exceeding threshold 40, and outlier 42, in word 1, is identified as exceeding threshold 44. Since for address block A all of the outliers can be encoded in less than 60 bits, the resulting bit stream is:

```
1-001/001-001/000-100/000-010/000-011/000-001/000-010/000-010/000-101/000-111
| |       |       |       |       |       |       |       |       |     |
code word1 word2   word3  word4  word5   word6   word7    word8
word9 end
```

where code 1 indicates per word characterization and 111 is an end code. (The 111 end code, of course, implies that no more than six (+) outliers can be recognized in any word, i.e., 110 means 6 or more.) If less space for characterizing information were available in the indicium, the program could recognize that there was insufficient room on a per word basis, and the characterizing information could be encoded as "xxxx/yyyy" on a per line basis. The resulting bit stream would be:

```
0-1010/0001-1010/0000-1001/0000-1111
| |         |         |         |
code line1      line2      line3    end
```

requiring only 29 bits, allowing a seven line address to be characterized in eight bytes.) This bit stream is then incorporated into the indicium as described above.

Another embodiment of the subject invention where the characterizing information comprises a description of the shape of the address block is shown in FIG. 5. The shape is determined by using a conventional "best fit" scanning algorithm which encloses address block A with "best fit" closed curve 50. (It should be understood that various algorithms for generating a best fit curve will generate different curves. These differences do not affect the subject invention so long as the same algorithm is used to generate the curve whose description is incorporated into the indicium and to recover the curve from the address block when the indicium is validated.) Preferably, curve 50 is constrained. A curve can be generated with limited information so that the resulting curve is simplified. In FIG. 5, curve 50 is formed from linked straight line segments, such as segment 51, which are limited to eight "directions", up (U), down (D), left (L), right I, up-right (UR), up-left (UL), down-right (DR), and down-left (DL); viewed as being generated starting in the upper left corner of address block A and traveling clockwise around address block A. Preferably the curve 50 also accounts for spaces between characters, words and lines, treating these spaces as equivalent to printed space, so that curve 50 does not become too convoluted and require extensive descriptive information. It is within the skill of a person skilled in the art to provide an algorithm which will generate robust and compact characterizing information, as described above.

The characterizing information, i.e., the description of curve 50, can be encoded in a number of ways. For example, each line segment can be described as a direction and length, preferably in pixels. Lengths can be normalized as described above with respect to FIG. 3. Alternatively, end points of line segments, such as end points 52 and 54 of segment 51, expressed in Cartesian co-ordinates or any convenient co-ordinate system, which is preferably scaled and referenced to address block A to reduce the amount of descriptive information needed, can be used to describe curve 50. The description of course is ultimately sent to meter 16 as a bit stream.

These methods of encoding have the advantage that they do not require an end code. Processor 26 needs only to detect closure of curve 50. However, these methods can require relatively large amounts of data if curve 50 is complex. Another method of describing curve 50 is to encode only the directions, without lengths, of each successive line segment.

EXAMPLE

Encoding line segment directions as:
R=000, L=111, U=001, D=110, UR=010, DL=101, DR=011, UL=100;

and starting at the upper left of address block A, curve 50 is described by the bit stream:

```
000-011-000-010-011-000-001-000-110-000-001-000-110-111-110-000-110-111-110-111-001-111-001-110
 |   |   |   |   |   |   |   |   |   |   |   |   |   |   |   |   | |  |   |   |   |   |   |
 R  DR   R   UR DR   R   U   R   D   R   U   R   D   L  D L  D   L   U   L   U   D(end)
R   D
```

Thus, curve 50 can be described in nine bytes, including an end code, which can be indicated by reversal (or repetition) of the immediately preceding segment direction. Again, this bit stream is incorporated into the indicium.

In other embodiments, the shape of only a portion of address block such as a word or line is described, or only a limited number of line segments are described, which will reduce the amount of data generated. Where only a limited number of segments are described, they can be selected by processor 26 to represent more complex parts of the curve.

Programming of a data processor to analyze scan data to perform imaging operations such as identifying lines and words, measuring the dimensions of letters and words or fitting a curve to an image in accordance with predetermined constraints are well known. Such operations are substantially routine in the character and general pattern recognition arts, for example. Techniques for carrying out such operations are also taught in *Handbook of Pattern Recognition and Image Processing,* edited by T Young and K-S Fu, Academic Press, 1986. Thus programming of scanner 24 and processor 26 to carry out the embodiments described above is well within the ability of those skilled in the art and need not be discussed further here for an understanding of the subject invention.

Figure 6:
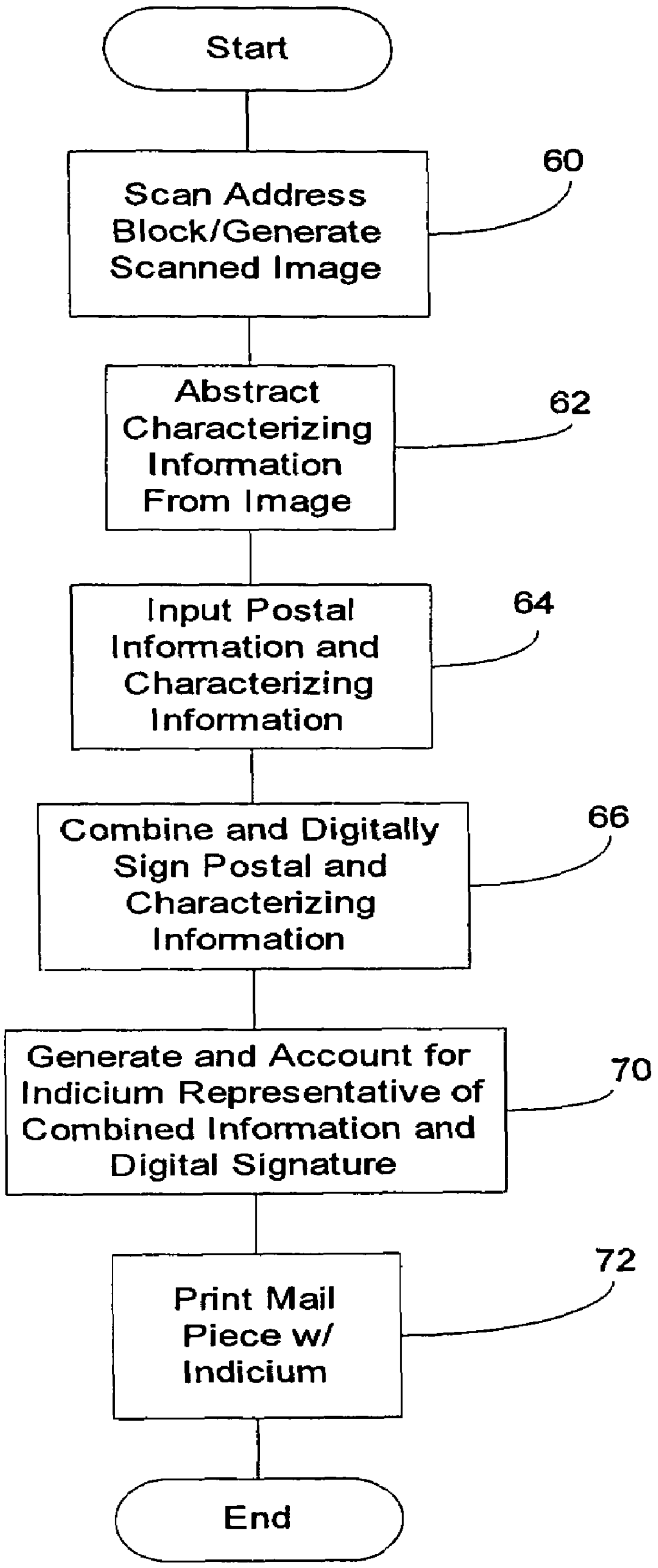
FIG. 6 shows a flow diagram of the operation of a secure postal indicia printing system, shown in FIG. 2.

FIG. 6 shows a flow diagram of the operation of indicia printing system 30. At step 60, processor 26 obtains a digital image of address block A, either from scanner 24 or from printer controller 12. At step 62, processor 26 abstracts characterizing information descriptive of address block A from the image.

At step 66, postage meter 16 inputs postal information such as the postage amount, date, etc., from a data processing system (not shown) or other source, and combines it with the characterizing information and digitally signs the combination. Then, at step 70, meter 16 generates indicium I representative of the combined information and digital signature, preferably as a combination of human-readable text and machine-readable binary code such as 2-dimensional bar code. At step 72, meter 16 controls printer 20 to print indicium I on mail piece E in a conventional manner.

The embodiments described above and illustrated in the attached drawings have been given by way of example and illustration only. From the teachings of the present application those skilled in the art will readily recognize numerous other embodiments in accordance with the present invention. Accordingly, limitations on the present invention are to be found only in the claims set forth below.

What is claimed:

1. A method for generating and printing an indicium on an object, said object having other material printed thereon, said method comprising the steps of:

a) obtaining a digital image of said other printed material and generating characterizing information descriptive of aspects of said image, said aspects being selected from the group consisting of, lengths of elements of said image, numbers of outliers in said image, and shapes of said image or of elements of said image, said characterizing information being selected to fit within said indicium;

b) cryptographically authenticating said characterizing information and other information;

c) generating said indicium to be representative of said cryptographically authenticated information;

d) printing said indicium on said object; and whereby e) said object's relationship to said indicium is verified by regenerating said characterizing information from said other printed material and comparing said regenerated characterizing information with characterizing information recovered from said indicium, and copies of said indicium cannot easily be used without detection on other objects which do not include said other printed material.

2. A method as described in claim 1 where said indicium is a postal indicium and said object is a mail piece.

3. A method as described in claim 2 where said other printed material is an address block and said characterizing information comprises measurements of word lengths of words comprised in said address block.

4. A method as described in claim 3 where said word lengths are normalized.

5. A method as described in claim 3 where said word lengths are expressed as a selected number of bits per word, said number of bits per word being selected so that lengths for all words in said address block can be expressed in a total number of bits less than or equal to a predetermined number.

6. A method as described in claim 2 where said other printed material is an address block and said characterizing information comprises a count of outliers in said address block.

7. A method as described in claim 6 where said outliers are counted on a per word basis.

8. A method as described in claim 6 where said outliers are counted on a per line basis.

9. A method as described in claim 6 where said characterizing information indicates whether said outliers are counted on a per word basis or on a per line basis.

10. A method as described in claim 6 where said characterizing information includes counts of upwards outliers and of downwards outliers.

11. A method as described in claim 2 where said other printed material is an address block and said characterizing information comprises information which is descriptive of the shape of said address block, or of lines, or of words comprised in said address block.

12. A method as described in claim 11 where said descriptive information comprises a description of a best fit curve enclosing said address block, or said lines, or said words.

13. A method as described in claim 12 where said curve is comprised of straight line segments.

14. A method as described in claim 13 where said curve is described in terms of a length and direction for at least selected ones of said segments.

15. A method as described in claim 13 where said curve is described in terms of coordinates of end points for at least selected ones of said segments.

16. A method as described in claim 13 where said curve is described in terms of direction, and without length, for at least selected ones of said segments.

17. A secure indicia printing system for generating and printing an indicium on an object, said object having other material printed thereon, comprising:

a) a printer for printing said indicium;

b) a processor for receiving a digital image of said other printed material, and for processing said image to abstract characterizing information descriptive of aspects of said image from said image, said aspects being selected from the group consisting of, lengths of elements of said image, numbers of outliers in said image, and shapes of said image or of elements of said image, said characterizing information being selected to fit within said indicium;

c) a meter, said meter communicating with said processor to receive said characterizing information, and having a communications link for receiving other information from another information source, and communicating with said printer, for;

c1) cryptographically authenticating said characterizing information and other information;

c2) generating said indicium to be representative of said cryptographically authenticated information; and c3) controlling said printer to print said indicium on said object; and d) said object's relationship to said indicium is verified by regenerating said characterizing information from said other printed material and comparing said regenerated characterizing information with characterizing information recovered from said indicium, and copies of said indicium cannot easily be used without detection on other objects which do not include said other printed material.

18. A system as described in claim 17 where said indicium is a postal indicium, and said object is a mail piece, said meter accounting for postal value represented by said indicium.

19. A system as described in claim 18 where said other printed material is an address block and said processor abstracts measurements of word lengths of words comprised in said address block to generate said characterizing information.

20. A system as described in claim 19 where said processor normalizes said word lengths.

21. A system as described in claim 19 where said processor expresses said word lengths as a selected number of bits per word, said number of bits per word being selected so that lengths for all words in said address block can be expressed in a total number of bits less than or equal to a predetermined number.

22. A system as described in claim 18 where said other printed material is an address block and said processor abstracts a count of outliers in said address block to generate said characterizing information.

23. A system as described in claim 22 where said processor counts said outliers on a per word basis.

24. A system as described in claim 22 where said processor counts said outliers on a per line basis.

25. A system as described in claim 22 where said processor selects whether to count said outliers on a per word or per line basis, and said characterizing information indicates whether said outliers are counted on a per word basis or on a per line basis.

26. A system as described in claim 22 where said processor counts upwards outliers and downwards outliers.

27. A system as described in claim 18 where said other printed material is an address block, and said processor abstracts information which is descriptive of the shape of said address block, or of lines, or of words comprised in said address block to generate said characterizing information.

28. A system as described in claim 27 where said descriptive information comprises a description of a best fit curve enclosing said address block, or said lines, or said words.

29. A system as described in claim 28 where said curve is comprised of straight line segments.

30. A method as described in claim 29 where said processor describes said curve in terms of a length and direction for at least selected ones of said segments.

31. A method as described in claim 29 where said processor describes said curve in terms of coordinates of end points for at least selected ones of said segments.

32. A method as described in claim 29 where said processor describes said curve in terms of direction, and without length, for at least selected ones of said segments.

* * * * *